United States Patent [19]

Herloski

[11] Patent Number: 5,526,185
[45] Date of Patent: Jun. 11, 1996

[54] METHOD AND SYSTEM FOR DESIGNING COLOR CORRECTED OPTICAL SYSTEMS

[75] Inventor: Robert P. Herloski, Webster, N.Y.

[73] Assignee: Xerox Corporation, Stamford, Conn.

[21] Appl. No.: 253,478

[22] Filed: Jun. 3, 1994

[51] Int. Cl.$^6$ ...................................................... G02B 3/00
[52] U.S. Cl. ............................................ 359/642; 364/525
[58] Field of Search ..................................... 359/797, 642; 364/524, 525, 526

[56] References Cited

U.S. PATENT DOCUMENTS 5,148,314  9/1992  Chen ........................................ 359/642

OTHER PUBLICATIONS

Robert D. Sigler; "Glass Selection for Airspaced Apochromats Using the Buchdahl Dispersion Equation"; Dec., 1986; pp. 4311–4320.

Max Herzberger and Nancy R. McClure; "The Design of Superachromatic Lenses"; Jun., 1963; pp. 553–560.

Dale A. Buralli and John R. Rogers; "Some Fundamental Limitations of Achromatic Holographic Systems"; 1989; pp. 1863–1868.

Paul N. Robb and R. I. Mercado; "Calculation of Refractive Indices Using Buchdahl's Chromatic Coordinate"; Apr. 15, 1983; pp. 1198–1215.

C. G. Wynne; "A Comprehensive First-Order Theory of Chromatic Aberration Secondary Spectrum Correction Without Special Glasses"; 1978; pp. 627–636.

G. W. Forbes; "Chromatic Coordinates in Aberration Theory"; Apr. 4, 1984; pp. 344–349.

Thomas Stone and Nicholas George; "Hybrid Diffractive-Refractive Lenses and Achromats"; Jul. 15, 1984; pp. 2960–2971.

William C. Sweatt; "Describing Holographic Optical Elements as Lenses"; Jun. 6, 1977; pp. 803–808.

Donald C. O'Shea; "The Monochromatic Quartet: A Search for the Global Optimum"; 1990; pp. 548–554.

*Primary Examiner*—Georgia Y. Epps
*Assistant Examiner*—Dawn-Marie Bey
*Attorney, Agent, or Firm*—Michael J. Nickerson

[57] ABSTRACT

The present invention provides a general system and method for designing arbitrary lens systems with reduced chromatic aberration without the reliance on rigorous trial and error methods and/or approximations. The system and method selects optical materials for a color corrected optical system by generating both axial color terms and lateral color terms for a predetermined lens system. From the generated color terms, a plurality of glass terms are calculated from a plurality or linear algebraic formulas generated by a multiplication of two matrices using the generated axial and lateral color terms as coefficient values of one of the matrices or other computational method. From the calculations, the particular optical materials and the predetermined lens design for a color corrected optical system are identified. This information can be used to facilitate the manufacturing of a lens system. The present invention can also take into account the use of diffractive optical elements.

15 Claims, 14 Drawing Sheets

METHOD AND SYSTEM FOR DESIGNING COLOR CORRECTED OPTICAL SYSTEMS

FIELD OF THE PRESENT INVENTION

The present invention relates generally to a method for designing color corrected optical systems. More particularly, the present invention pertains to the selection of optical materials and/or lens systems for designing optical systems that are color corrected for a wide range of wavelengths.

BACKGROUND OF THE PRESENT INVENTION

Optical systems are widely used in a variety of applications. One such application is the utilization of an optical system in a digital scanner or light lens copier. The optical system in a light lens copier is used to focus or direct light from a light source to a document or to focus or direct light reflected or transmitted from the document to a photoreceptor. On the other hand, an optical system in a digital scanner is used to focus or direct light from a light source to a document or to focus or direct light reflected or transmitted from the document to a CCD sensor device or full width array sensor. In carrying out this process, it is critical that the optical system directs the light to its destination without any errors.

A common error associated with optical systems is chromatic aberration. Chromatic aberration is classically defined in terms of paraxial ray intercept differences in light of two different wavelengths. This is illustrated in FIG. 1, which shows that axial color, involving the marginal ray, can be expressed either as a longitudinal error ($\Delta f$) or a transverse error ($\Delta y$). Lateral color, involving the chief ray, is defined as a transverse error ($\overline{\Delta y}$). If the axial ray aberration is zero at two distinct wavelengths, the lens system is considered achromatic.

A mathematical way to look at chromatic aberration is to plot the axial and lateral color error as a function of wavelength as seen in FIG. 11. FIG. 11 shows transverse axial and lateral chromatic aberrations plotted as a function of wavelength $\lambda$ for a Kingslake Telephoto lens system using normal glasses. As can be seen from this Figure, the primary axial color correction is defined by the two widely spaced wavelengths. Moreover, it is noted that the maximum ray aberration error found at the intermediate wavelengths is defined as secondary spectrum.

The system shown in FIG. 11 has been designed to reduce chromatic aberration in the classical sense. In the classical definition, color correction refers to the lens system being color corrected at specific wavelengths. Thus, since FIG. 11 shows no axial color error at the approximate wavelengths of 460 nanometers and 585 nanometers and no lateral color errors at the approximate wavelengths of 425 nanometers and 575 nanometers, the Kingslake Telephoto system of FIG. 11, by the classical definition, is color corrected. However, to realize a more versatile color corrected lens system, the plots of the axial and lateral color error should be relatively flat and track the horizontal origin. If the system corresponding to FIG. 11 was to be color corrected in a more versatile manner, the two plots would be relatively flat and tracking the horizontal origin. Therefore, a goal of lens designing is to realize a lens system that is color corrected in a very versatile manner.

One problem in designing a color corrected optical system is the control of chromatic aberration through the selection of optical materials. In the past, designing color corrected optical systems has been a manual calculation relying on trial and error and experience. What is desired is a solution wherein lens system design is less rigorous and does not require a large amount of experience to implement.

Conventionally, the problem has been addressed using the classic "P vs. V glass triangle" method and the P* vs. P** technique. These methods assume thin lenses are in contact as an approximation. However, both of these methods cannot handle a lens system with significant air spaces.

In another conventional approach, the index of refraction of the optical materials, the optical power of a lens or lens system, is used in the calculations to color correct the system. However, as is well known, the index of refraction, N, is nonlinear when expressed as a function of $\lambda$. Therefore, a third approach has been used which utilizes a rational function of $\lambda$, a chromatic coordinate $\omega$. By expressing N as a function of $\omega$, only two or three terms are needed to accurately model the refractive index variation, far fewer than if $\lambda$ was the expansion variable. This third approach is commonly known as the Sigler method.

The use of the chromatic coordinate, $\omega$, or the Sigler method, enables a method of glass selection for air spaced achromats by using an equivalent set of equations for primary and secondary color as a function of $\omega$. In this method, the optical material constants are defined as $\eta_j = v_j/(N_0-1)$. This method also involves the use of a weighted summation of glass "vectors" in $\eta_1$ vs. $\eta_2$ space, similar to the classic "P vs. V glass triangle" method, but this method is more powerful since $\eta_1$ and $\eta_2$ represent true Taylor series coefficients (using $\omega$ as the expansion variable). In this method, $\eta_1 = \eta_2 = 0$ signifies the point of full primary and secondary color correction. However, this designing method also uses approximations, which give erroneous results if the air spaces in the lens system are large or the chromatic residual of a lens is large.

As shown above, some of the conventional methods for selecting optical materials rely on manual calculations, trial and error, and/or experience. Moreover, each of these methods rely on approximations being made in the chromatic aberration correction technique. To avoid the manual aspects of these methods, computer-aided searches have been utilized. An example of a computer-aided search to identify pairs of optical materials suitable for designing color corrected lens doublets is disclosed in U.S. Pat. No. 5,210,646 to Mercado et al. The entire contents of U.S. Pat. No. 5,210,646 are hereby incorporated by reference.

Mercado et al. discloses a computer-aided method for selecting optical materials to be used in designing a color corrected lens system. The method assumes that system consists of thin lenses in contact. As with other methods, Mercado et al. uses the chromatic coordinate, $\omega$, in the calculations to select the proper glass materials for the lens system. (It is noted that glass materials, as applicable to the present invention, can be simple glasses, plastics, or any other optical materials that are typically used in designing lens systems.) Thus, given that $$\omega = \frac{(\lambda - \lambda_0)}{1 + \frac{5}{2}(\lambda - \lambda_0)} = \frac{\Delta \lambda}{1 + \frac{5}{2}\Delta \lambda}, \quad (1)$$

the definition of the refractive index $N(\omega)$ is $$N(\omega) = N_0 + v_1 \omega + v_2 \omega^2 + v_3 \omega^3 + \ldots, \quad (2)$$

and the optical material constants $v_i$ and $\eta_1$ are $$\eta_i = \frac{v_i}{N_0 - 1} . \tag{3}$$

Given the equations above, Sigler utilized the chromatic coordinate and developed a method of glass selection for air spaced achromats which took the classic equation for axial color $\Delta y$:

$$\Delta y \sim \sum_i \frac{y_i^2 \phi_i}{V_i} , \tag{4}$$

and empirically converted it to an equivalent equation for primary and secondary color as a function of $\omega$ and $\eta_i$ $$\Delta y \sim \sum_i y_i^2 \phi_i \eta_{1i} \omega + \sum_i y_i^2 \phi_i \eta_{2i} \omega^2 . \tag{5}$$

The approach used by Mercado et al. and Sigler for axial color correction assumes that the total contribution to secondary axial color is equivalent to that of a thin lens system. The effect of this assumption is to: (a) neglect a lens' thickness, and (b) neglect the induced component.

This approach, however, does not lead to a method of general validity for identifying compatible combinations of optical materials for designing color corrected lens systems since the method cannot be readily applied to a thick lens system or lens systems with separated components.

Thus, the conventional methods for correcting optical systems for chromatic aberration have remained either rigorous "cut-and-try" methods, methods with approximations, or methods having no general applicability.

SUMMARY OF THE PRESENT INVENTION

One aspect of the present invention is a method for selecting optical materials for a color corrected optical system. This method generates both axial color terms and lateral color terms for a predetermined lens system. From the generated color terms, a plurality of glass terms are calculated from a plurality of linear algebraic formulas generated as a function of a plurality of matrices using the generated axial and lateral color terms as coefficient values. The method then determines the particular optical materials and the predetermined lens design as parameters for a color corrected optical system.

Another aspect of the present invention is a system for selecting optical materials for a color corrected optical system. The system receives information defining a predetermined lens system and generates axial color terms and lateral color terms for the predetermined lens system. A processor calculates a plurality of glass terms from a plurality of linear algebraic formulas generated as a function of a plurality of matrices using the generated axial and lateral color terms as coefficient values in one of the matrices. Lastly, the system determines the particular optical materials and the predetermined lens design as parameters for a color corrected optical system.

A third aspect of the present invention is a color corrected optical system having a plurality of lenses. Each lens is constructed of an optical material. The optical materials are selected by generating axial color terms and lateral color terms for a predetermined lens system, calculating a plurality of glass terms from a plurality of linear algebraic formulas generated as a function of a plurality of matrices using the generated axial and lateral color terms as coefficient values in one of the matrices, and identifying particular optical materials associated the calculated glass terms so that the particular optical materials are selected as the optical materials constructing the lenses to be used in the predetermined lens system.

Further objects and advantages of the present invention will become apparent from the following description of the various features of the present invention.

BRIEF DESCRIPTION OF THE DRAWINGS

The following is a brief description of each drawing used to describe the present invention, and thus, the drawings are being presented for illustrative purposes only and should not limit the scope of the present invention, wherein.

DETAILED DESCRIPTION OF THE DRAWINGS

Figure 1:
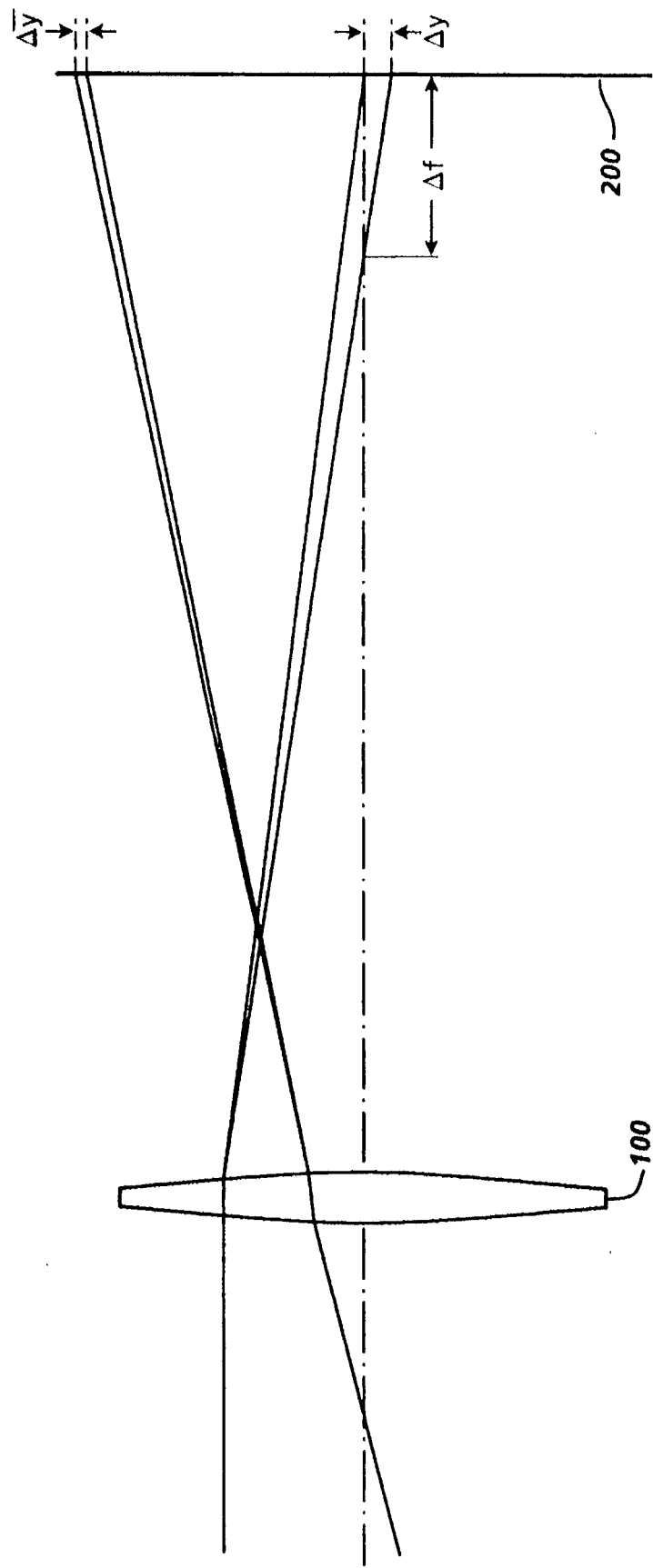
FIG. 1 illustrates a diagram showing chromatic errors.

The following will be a detailed description of the drawings illustrating the present invention. In this description, as well as in the drawings, like reference numerals represent like devices or circuits or equivalent circuits which perform the same or equivalent functions.

Figure 2:
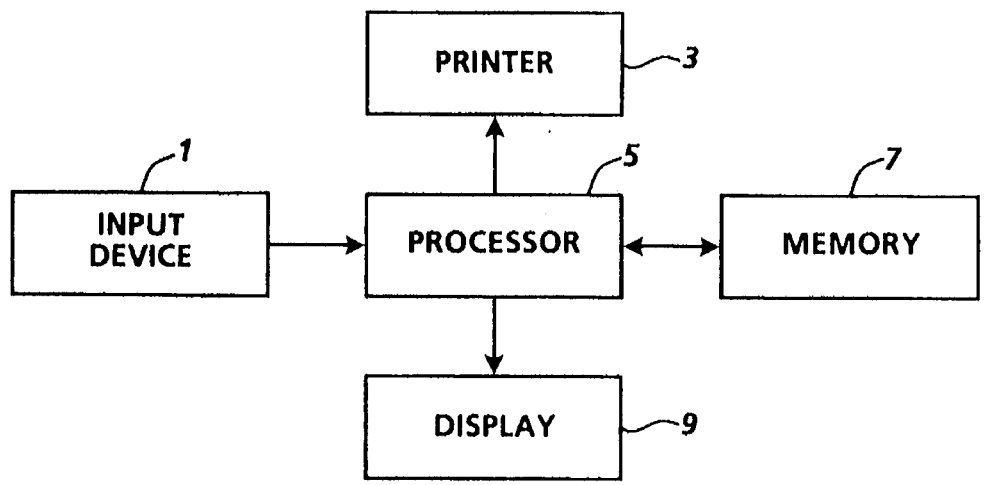
FIG. 2 illustrates a block diagram showing implementing the process of the present invention.

FIG. 2 represents an electronic system which utilizes the various concepts of the present invention. More specifically, this system includes an input device 1 which is capable of inputting information electronically to a processor 5. Such an input device 1 may be a keyboard or other type of input device which is capable of inputting the necessary lens or glass data to the processor 5. The processor 5 receives this data and analyzes the data according to the process of the present invention. The processor utilizes a memory 7. Memory 7 may consist of a plurality of read only memories having stored therein various look-up tables corresponding to characteristics of optical materials. Moreover, the memory 7 may have read only memories having look-up tables containing axial and lateral color terms corresponding to known lens forms. The results of the analysis by the processor 5 can be utilized in retrieving the desired information, either the selected optical materials or lens design depending on the purpose of the analysis, from the memory 7. The information retrieved can be sent to a printer 3 or displayed on a display device 9 so as to inform the user as to the color corrected lens system with the appropriate optical materials. The actual process carried out by the present invention will now be described.

As set forth above, conventional methods are effectively limited to thin lens systems and are not able to calculate exact higher order chromatic aberrations for thick and/or separated lens systems. In contrast, the present invention proposes a method which is not limited to thin lens systems and is able to calculate the exact higher order chromatic aberrations for thick and/or separated lens systems. As with the other methods, the preferred embodiment of the present invention utilizes the chromatic color term, $\omega$, discussed above. It should be noted that the exact form of $\omega$ is unimportant since any well known definition of $\omega$ can be utilized in the present invention. What is important is that the series implied by the equations below converges rapidly.

Using the chromatic color term, $\omega$, the chromatic ray aberration $\epsilon_{yk}'$, according to Buchdahl, can be expanded into a Taylor series with respect to $\omega$:

$$\epsilon_{yk}' \sim (F_{ak}^{(1)'} \rho \cos \theta + \overline{F}_{ak}^{(1)'} H)\omega + (F_{ak}^{(2)'} \rho \cos \theta + \overline{F}_{ak}^{(2)'} H)\omega^2 + \ldots, \quad (6)$$

where:

$$F_{ak}^{(n)'} = \sum_{J=1}^{K} f_{aJ}^{(n)} \quad (7)$$

is the nth order axial chromatic aberration coefficient, and $$\overline{F}_{ak}^{(n)'} = \sum_{J=1}^{K} \overline{f}_{aJ}^{(n)} \quad (8)$$

is the nth order lateral chromatic aberration coefficient. As before, the parameters f and $\overline{f}$ are the axial and lateral color contributions, respectively. The contributions can either be surface (subscript j) or air spaced element (subscript J) contributions. Since a buried surface can be considered two surfaces separated by a zero thickness air gap, the air spaced element contribution formulation can be used for all optical systems because the element contributions change when refractive index characteristics are varied in the design process.

The primary axial color element contribution is $$f_{aJ}^{(1)} = [(N_{0J} - 1)w_{aJ}]\eta_{1J}; \quad w_{aJ} = (y_j i_j' - y_{j+1} i_{j+1}), \quad (9)$$

where $y_j$ and $i_j$ are the paraxial marginal ray heights and incidence angles at the jth surface, which is the first surface of the Jth element, etc. Also, the secondary axial color element contribution is $$f_{aJ}^{(2)} = f_{aJ}^{(2)} + \frac{1}{\phi} \left[ \overline{f}_{aJ}^{(1)} \sum_{L=1}^{J-1} f_{aL}^{(1)} - f_{aJ}^{(1)} \sum_{L=1}^{J-1} \overline{f}_{bL}^{(1)} \right], \quad (10)$$

where $\phi$ is the optical invariant. Note that the total secondary contribution consists of both an intrinsic and an induced component. The intrinsic secondary axial color contribution is $$f_{aJ}^{(2)} = [(N_{0J} - 1)w_{aJ}]\eta_{2J} + \frac{(N_{0J} - 1)^2 d_J i_j i_{j+1}}{N_{0J}^2} \cdot \eta_{1J}^2 \quad (11)$$

These equations are valid for any order chromatic aberration, for any optical system. In Equations (9) and (10), the most important term is $(N_{0J}-1)w_{aJ}$. It is noted that $(N_{0J}-1)w_{aJ}$ tends to $y_j^2 \phi_J$ for a thin lens, and $\frac{1}{2}w_{aJ}$ tends to Conrady's (d-D) term for a paraxial limit.

As mentioned previously, Equations (6)-(11) can be used to completely characterize the chromatic aberrations of an arbitrarily complex optical system without approximation. Therefore, these equations could be used as the basis for eliminating chromatic aberrations in optical systems. However, it is difficult to solve these equations manually for the values $\eta_{1J}$, $\eta_{2J}$ and achieve a result in a moderately complex optical system with no secondary chromatic aberrations. Therefore, some design methodology is needed to address this factor.

The present invention addresses such a methodology. Initially, the above equations are rewritten. The rewritten equations are set forth below as Equation (12):

$$\epsilon_{yk}' \approx \left( \left\{ \sum_{J=1}^{K} [(N_{0J}-1)w_{aJ}\eta_{1J}] \right\} \omega + \right. \quad (12)$$

$$\left\{ \sum_{J=1}^{K} [(N_{0J}-1)w_{aJ}\eta_{2J}] \right\} \omega^2 + \ldots \Bigg) \rho \cos \theta +$$

$$\left( \left\{ \sum_{J=1}^{K} [(N_{0J}-1)\overline{w}_{aJ}\eta_{1J}] \right\} \omega + \right.$$

$$\left\{ \sum_{J=1}^{K} [(N_{0J}-1)\overline{w}_{aJ}\eta_{2J}] \right\} \omega^2 + \ldots \Bigg) H.$$

In Equation (12), the second intrinsic component and the induced component of the secondary chromatic aberrations of Equations (10) and (11) have been neglected.

To realize zero chromatic aberration, the calculations require that each term which multiplies a power of $\omega$ must be individually equal to zero. Thus, Equation (12) can be rewritten as Equation (13) in a matrix form as set forth below:

$$\begin{pmatrix} \eta_{11} \, \eta_{12} \, \eta_{13} \\ \eta_{21} \, \eta_{22} \, \eta_{23} \, \ldots \\ \cdot \\ \cdot \\ \cdot \end{pmatrix} \begin{pmatrix} a_1 \, b_1 \\ a_2 \, b_2 \\ \cdot \\ \cdot \\ \cdot \end{pmatrix} = (0) \quad (13)$$

Equation (13) is a generalized linear algebraic formulation of the color correction problem for optical systems. This equation enables an user to make simple optical material choices for subsequent optimization. Moreover, this matrix equation allows for higher order (third, fourth, etc.) calculations. The $a_J$'s represent the axial color terms $(N_{0J}-1)w_{aJ}$ and the $b_J$'s represent the lateral color terms $(N_{0J}-1)\overline{w}_{aJ}$. These terms are unique to particular lens systems, thus, one skilled in the art would readily know these terms upon selecting a certain lens system. Moreover, the $\eta_{ij}$ values are called interchangeably, for the purposes of this application, glass terms or chromatic correction terms. These glass terms or chromatic correction terms represent the glass map characteristics of the optical materials. As noted before, these optical materials can represent glasses, plastics, liquids, gases, diffractive optical elements, and any other optical materials suitable for lens systems.

Since Equation (13) is a set of homogeneous equations, the $a_J$ and $b_J$ values can be normalized so that $a_1=b_1=1.0$. For example, one skilled in the art would realize that for a Cooke Triplet system, the normalized terms would be approximately: $a_1=1.0$; $a_2=1.1$; $a_3=0.9$; $b_1=1.0$; $b_2=0.04$; and $b_3=-1.04$.

Figure 11:
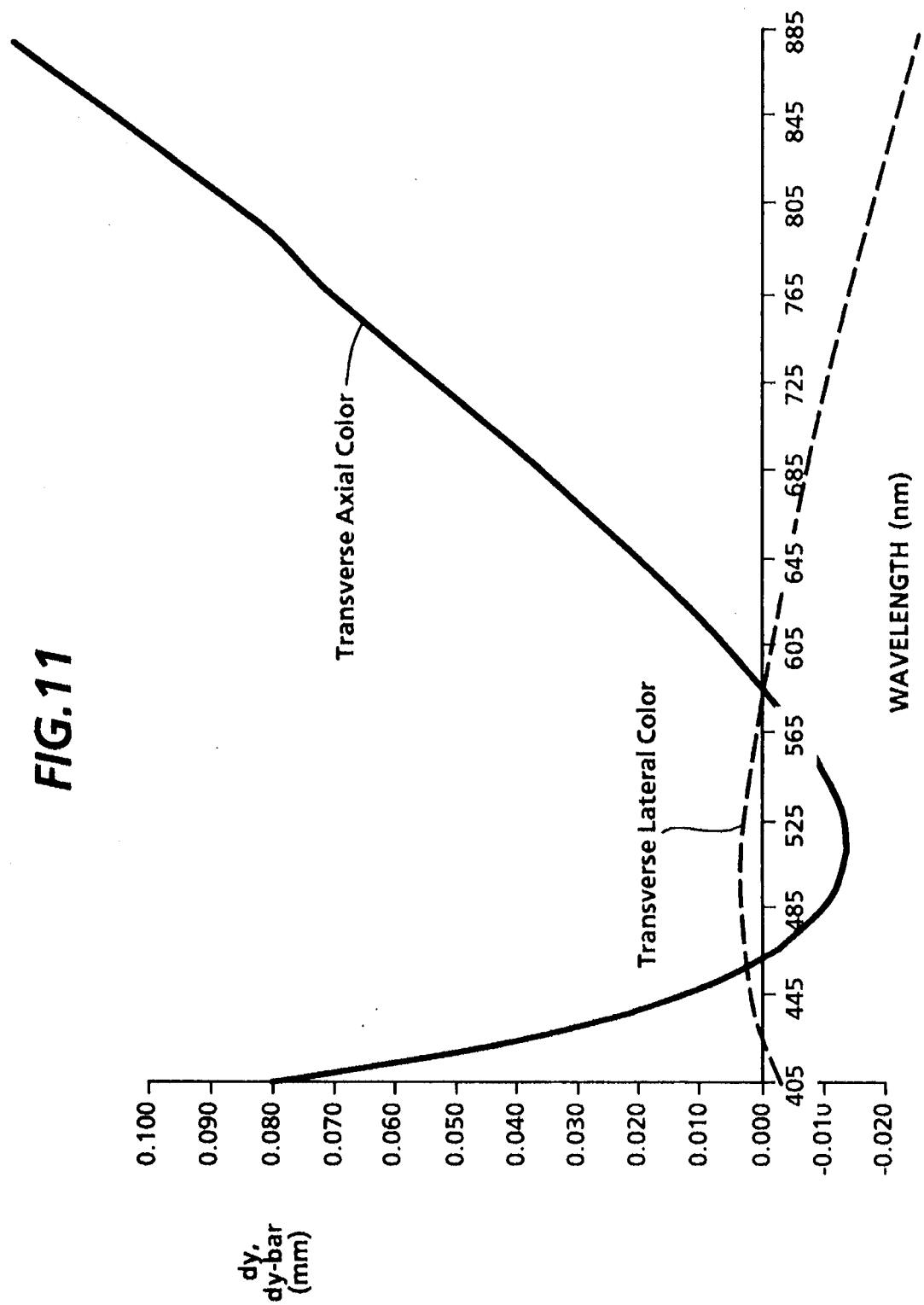
FIG. 11 is a graph illustrating transverse axial and transverse lateral errors as a function of wavelength for a typical Kingslake Telephoto lens system of normal glasses.

The matrix formula, set forth above, represents color correction in a non-classical sense. As mentioned above, classical color correction corrects the lens system for specific wavelengths; i.e., the zero crossings of the horizontal axis as shown in FIG. 11. The present invention corrects for color aberration by designing a system having the first and higher order derivatives zero or substantially zero at the center wavelength of the glass material. In other words, the lens system has substantially no color error over a range of wavelengths.

Figure 17:
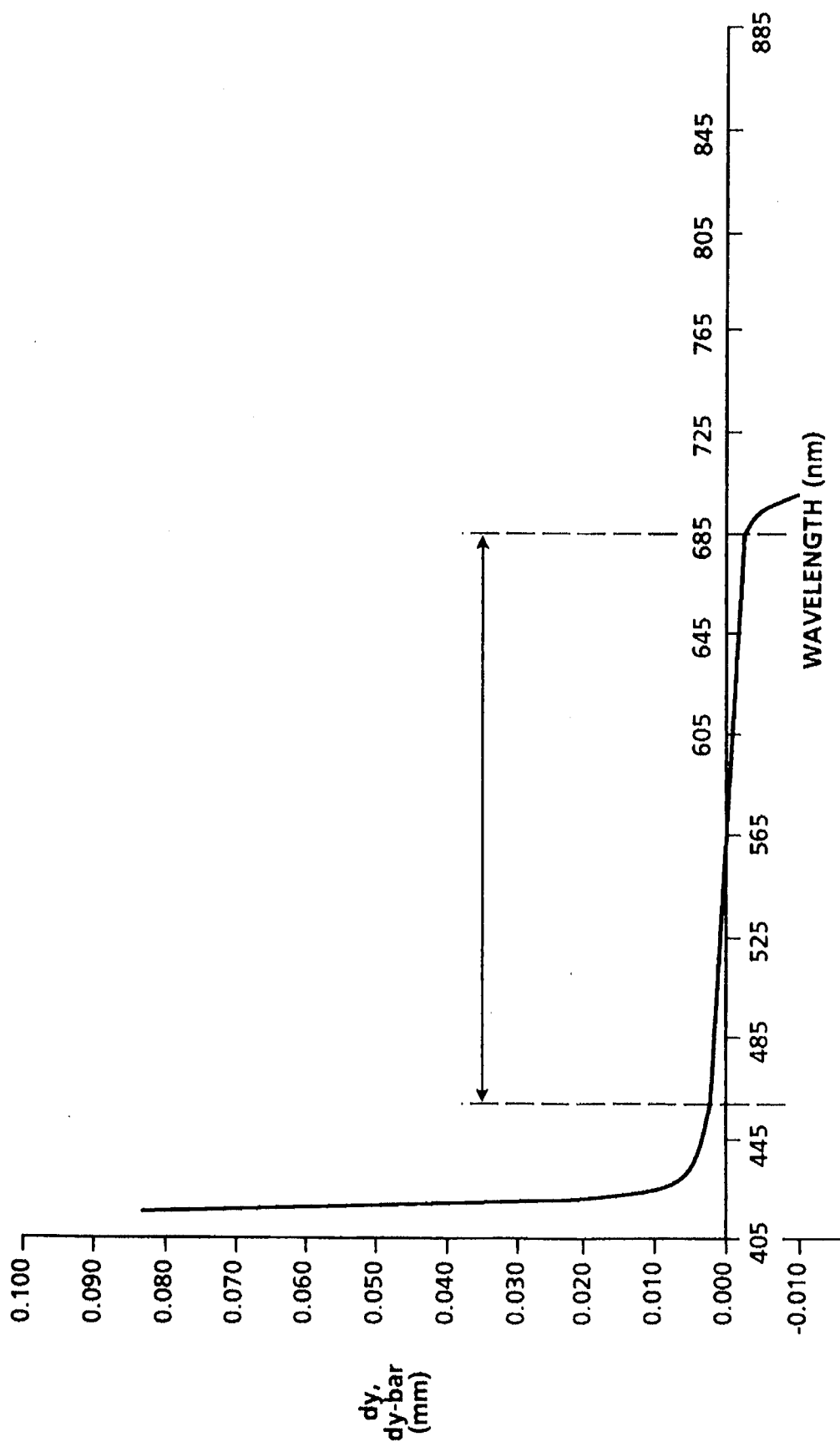
FIG. 17 is a graph illustrating the typical color correction results of the present invention.

An example of a typical color correction plot, after utilizing the present invention, is shown in FIG. 17. In FIG. 17, the portion of the plot which is between the dashed lines represent the range of wavelengths where there is substantially no color aberration. Again, this is realized by finding optical materials that have their first and higher order derivatives equal to zero or substantially equal to zero at the center wavelength. In this example, the center wavelength is 565 nanometers. It is noted that having higher order derivatives at the center wavelength equal to zero may increase the range and/or reduce the color aberration within the range.

Using this formula, the primary chromatic aberrations of an arbitrarily complex optical system can be accurately corrected, but, as mentioned before, the secondary (and higher order) chromatic correction will only be approximated. However, one could use Buchdahl's equations mentioned above to accurately correct for secondary and higher order chromatic aberration, if needed. It is noted that a variety of linear algebraic techniques can be used to solve the matrix equations. Thus, Equation (13) can readily identify optical materials that have the potential of correcting chromatic aberrations for an arbitrary optical system.

Equation (13) is also useful when a particular design form has been predetermined to compensate for monochromatic aberrations. The $a_J$ values are relatively constant within a design form, thus the lens design method can be partitioned by assuming that the determination of the $\eta_{i,j}$'s (chromatic correction) can be performed substantially independently of the determination of the $a_J$'s (monochromatic correction). It is noted that these corrections are not perfectly orthogonal, and a final lens design may represent an optimized tradeoff among monochromatic and chromatic aberrations.

The design method of the present invention can also be utilized to correct chromatic aberration using a diffractive optical element as the means to correct chromatic aberration. Diffractive optical elements have well defined $\eta_i$ values, hence they can be used with the optical materials selection technique of the present invention to correct chromatic aberration in arbitrary lens systems.

Figure 3:
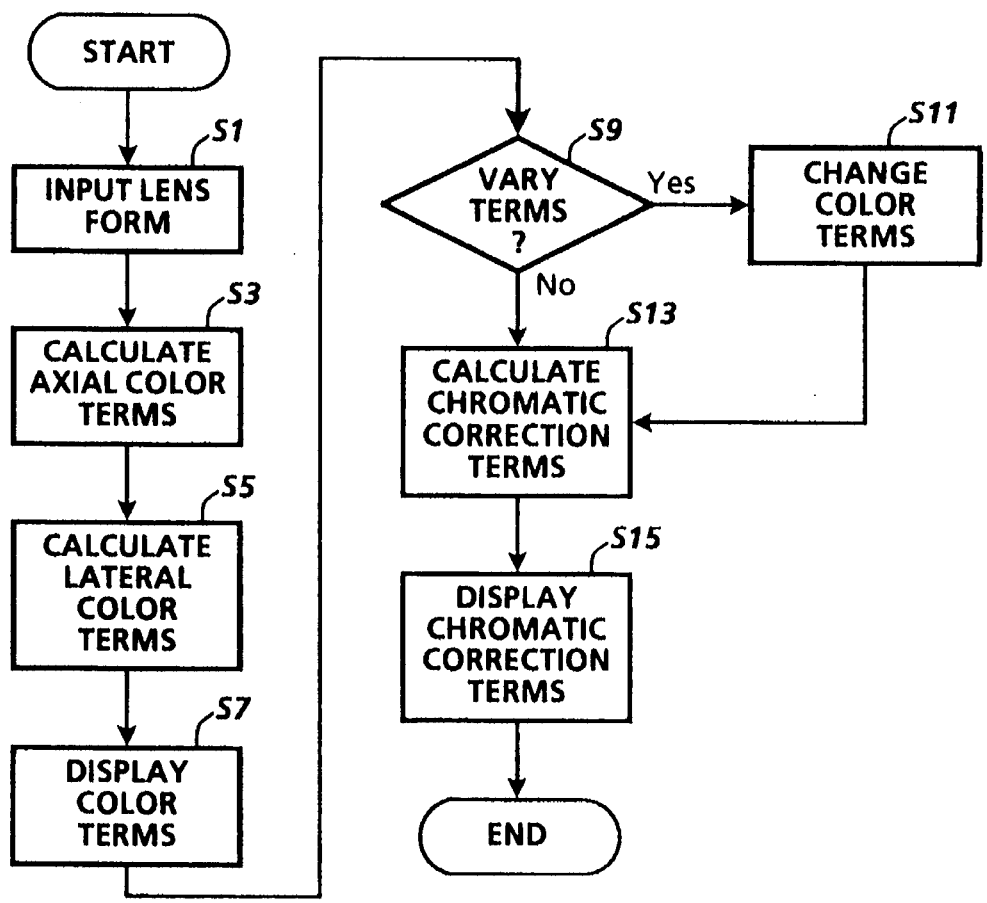
FIG. 3 is a flowchart illustrating a method for carrying out one embodiment of the present invention.

FIG. 3 illustrates one method of the present invention for determining the optical materials to be utilized in an optical lens system. At step S1, the form of the lens is inputted; i.e., Cooke triplet, Kingslake Telephoto, etc. Upon inputting the form of the lens to be designed, steps S3 and S5 determine the axial color terms and lateral color terms, respectfully, of the lens form. These terms can be calculated exactly or the system can utilize the inputted lens form to retrieve a range of axial color terms or lateral color terms associated with that lens system from a look-up table.

After determining the axial color terms and lateral color terms, step S7 displays these terms for verification by the designer. At this point, step S9 allows the designer to vary the terms or pick the exact terms to be utilized in the calculation if the system is displaying a range of terms for the inputted lens form. If the designer chooses to change the color terms, the process moves to step S11 whereat the designer can input the exact axial color terms and lateral color terms into the lens matrix which is used in the calculation.

If the designer chooses not the change the display terms or the designer has changed the display terms, the process proceeds to step S13 where the chromatic correction terms, the coefficients of the glass matrix, are calculated. At this step, the process utilizes the matrix formulation discussed above. More specifically, the process inserts the axial color terms and lateral color terms into the lens matrix. Thereafter, the glass matrix is multiplied by the lens matrix and set equal to zero. Upon solving the linear algebraic formulas associated with the matrix multiplication, the process generates chromatic correction terms; $\eta_{1,j}$, $\eta_{2,j}$, $\eta_{3,j}$, etc.; associated with individual optical materials. The chromatic correction terms can be displayed at step S15 wherein the designer can plot these terms on a glass map to determine the exact optical materials to be utilized in the optical lens system.

Figure 4:
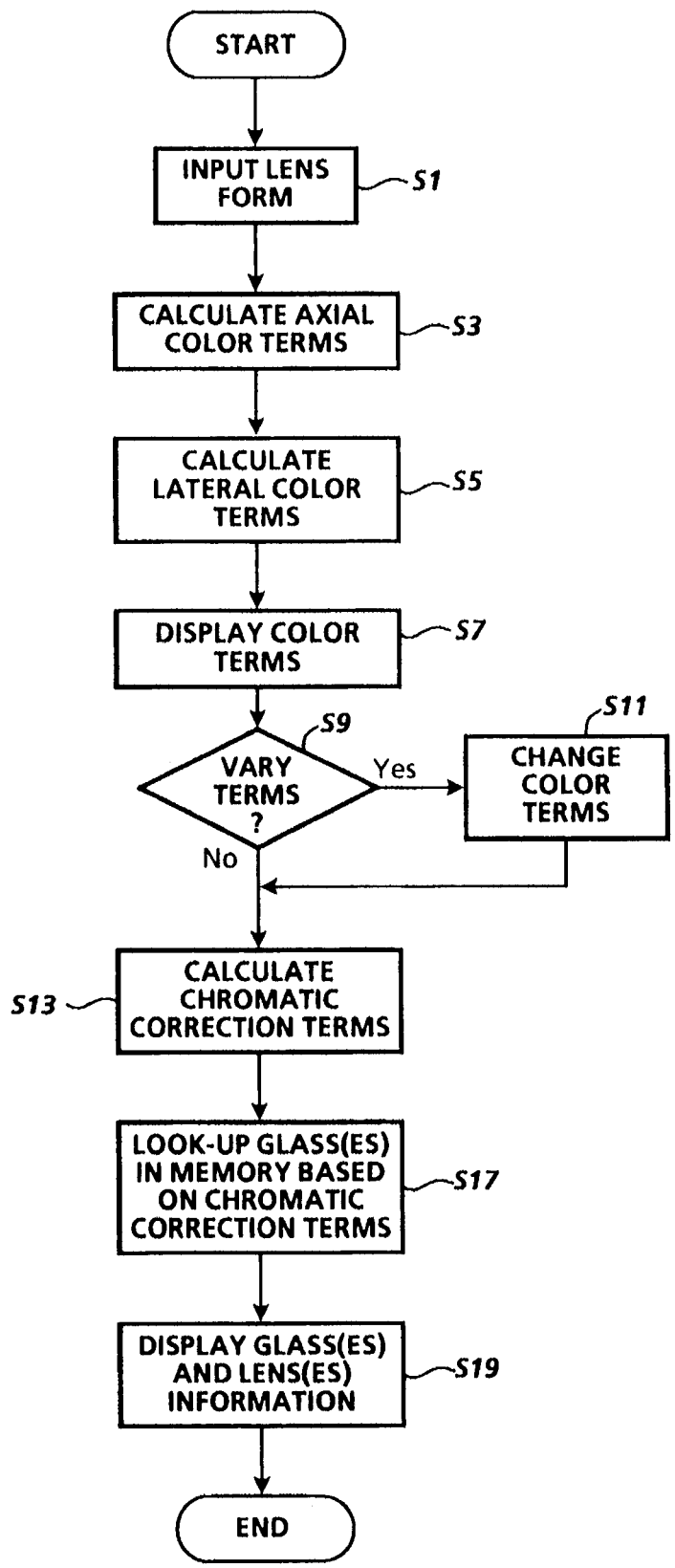
FIG. 4 is a flowchart illustrating a method for carrying out another embodiment of the present invention.

FIG. 4 illustrates a variation of the process described in FIG. 3. The difference between the process in FIG. 3 and the process in FIG. 4 is how FIG. 4 utilizes the calculated chromatic correction terms in step S13. In FIG. 4, upon calculating the chromatic correction terms at step S13, the process proceeds to step S17 wherein these terms are utilized as part of a mapping function (look-up table) to actually determine the optical materials to be utilized in the optical lens system. Upon determining these glasses, step S19 displays the optical materials and lens information on a display screen or prints the information on a printer.

Figure 5:
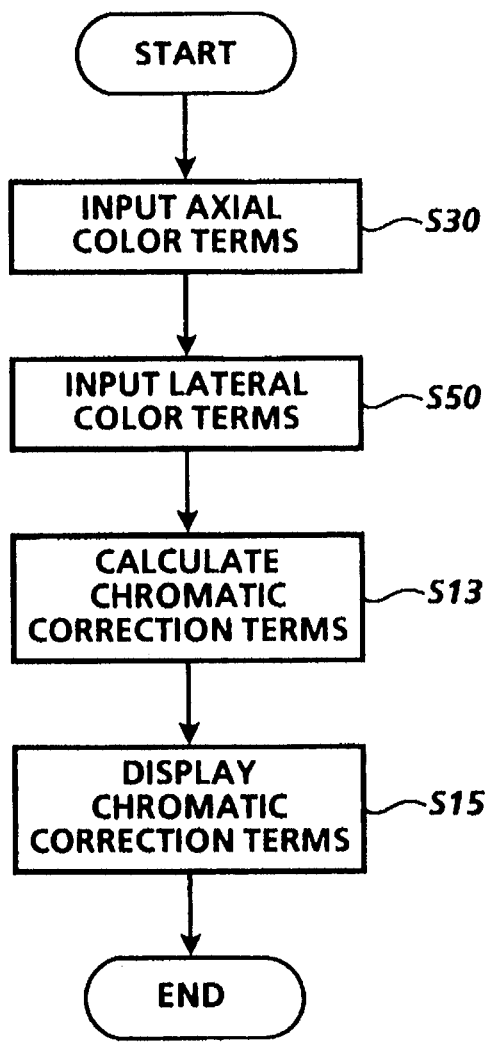
FIG. 5 is a flowchart illustrating a method for carrying out a third embodiment of the present invention.

FIG. 5 illustrates a process which is also a variation of the process illustrated in FIG. 3. In FIG. 5, the axial color terms and lateral color terms are directly inputted at steps S30 and S50. In this situation, the designer already knows the axial color terms and lateral color terms to be utilized in designing the optical lens system. After inputting these terms directly, step S13 calculates the chromatic correction terms in the same manner as FIG. 3. Lastly, the chromatic correction terms are displayed at step S15 as in FIG. 3.

Figure 6:
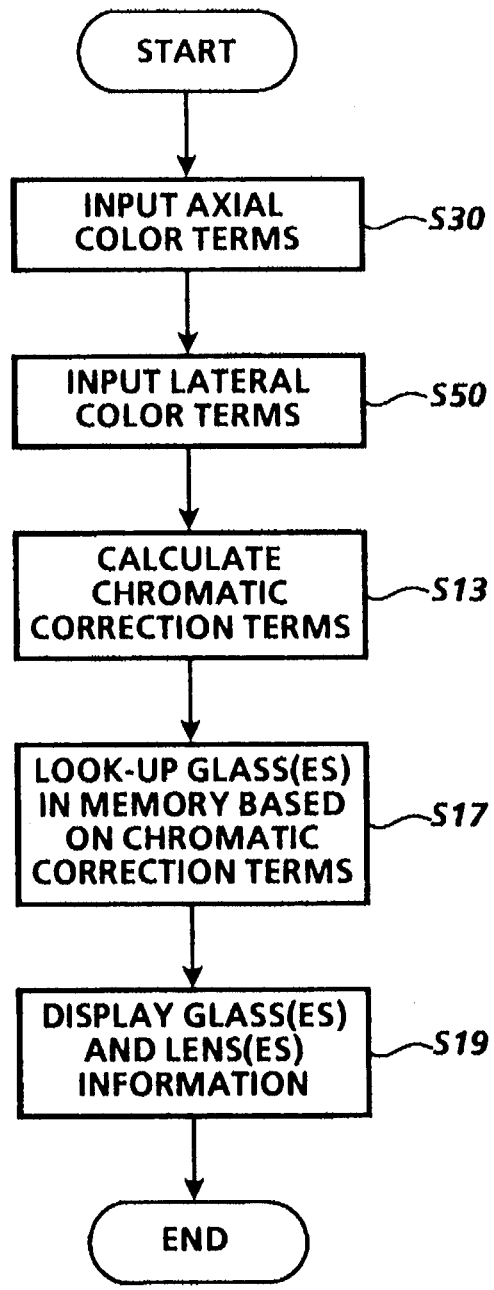
FIG. 6 is a flowchart illustrating a method for carrying out a fourth embodiment of the present invention.

FIG. 6 illustrates a variation upon the process illustrated by FIG. 5. In FIG. 6, like in FIG. 4, the calculated correction terms are utilized in a mapping function in step S17 to determine the actual optical materials to be utilized in the optical lens system. This optical material and lens information is then conveyed to the designer at step S19.

Figure 7:
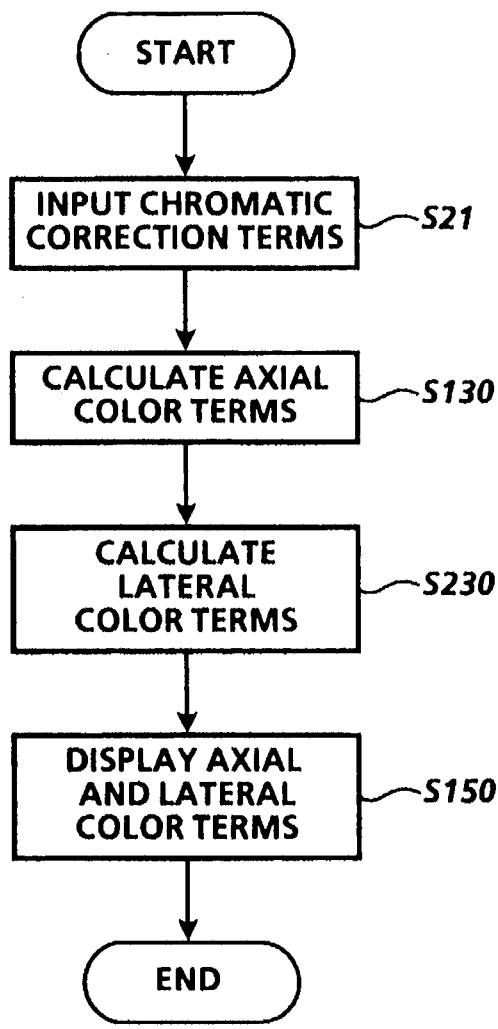
FIG. 7 is a flowchart illustrating a method for carrying out a fifth embodiment of the present invention.

FIG. 7 illustrates a design process wherein the optical materials are known, but the actual lens system is unknown. In FIG. 7, at step S21, the designer inputs the chromatic correction terms of the glasses to be utilized in the optical lens system. These chromatic correction terms can be either derived from a glass map or the process can be programmed to include a look-up table such that the designer merely inputs the code name for the optical material and the look-up table generates the correct chromatic correction terms. The inputted chromatic correction terms are inserted into the glass matrix wherein the glass matrix is multiplied by a lens matrix and set equal to zero. Solving the linear algebraic formulas associated with the matrix multiplication, the axial color terms and lateral color terms can be calculated at steps S130 and S230, respectfully. Upon calculation of these color terms, the process conveys the axial and lateral color terms to the designer as step S150.

Figure 8:
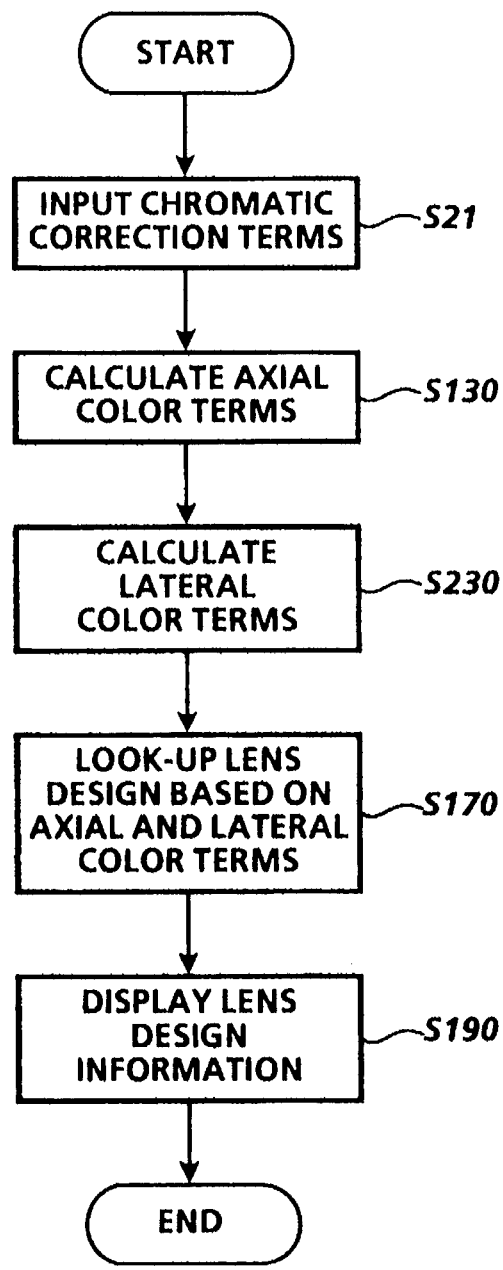
FIG. 8 is a flowchart illustrating a method for carrying out a sixth embodiment of the present invention.

FIG. 8 illustrates another process for determining the lens form based upon inputted chromatic correction terms wherein the actual lens design information is displayed. More specifically, upon calculating the axial color and lateral color terms in steps S130 and S230, respectfully, these terms are mapped to determine the axial lens design at step S170. This determination is then conveyed to the designer at step S190.

Figure 9:
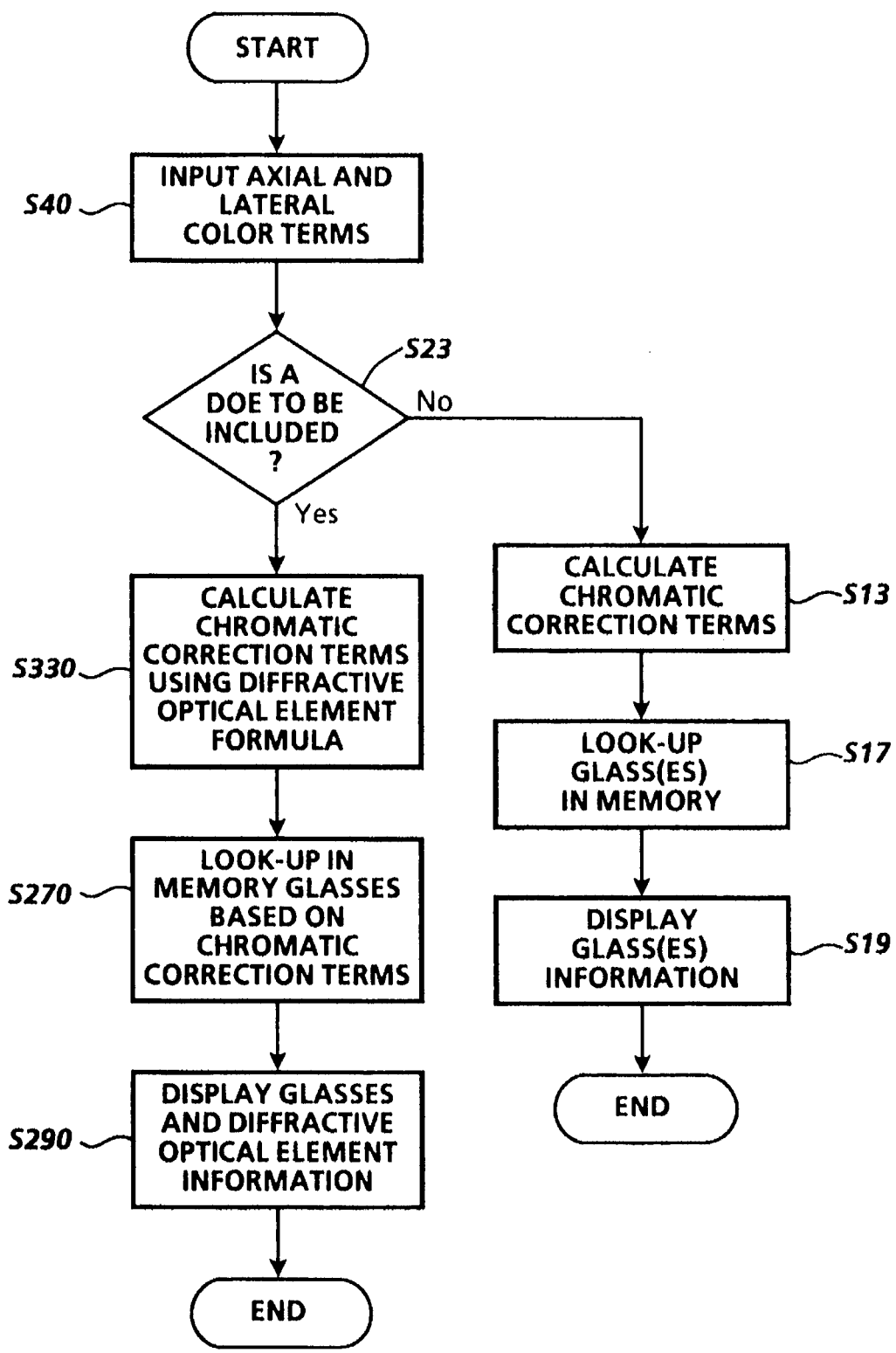
FIG. 9 is a flowchart illustrating a method for carrying out a seventh embodiment of the present invention.

FIG. 9 illustrates a process for designing an optical lens system which accounts for the utilization of a diffractive optical element. In FIG. 9, at step S40, axial and lateral color terms are inputted by the designer. It is noted that the axial and lateral color terms can also be derived in the same manner as illustrated in FIG. 3. Once the axial and lateral color terms are established in step S40, step S23 determines whether a diffractive optical element is to be included in the lens system. One criteria for making this determination can be analyzing the absolute value of the ratio of the positive coefficients of the axial terms to the negative coefficients of the axial terms. If this ratio is greater than a predetermined number, the user may desire to include a diffractive optical element in the lens system design.

If no diffractive optical element is to be included in the system, the process carries out steps S13, S17, and S19 as discussed above with respect to FIG. 4. However, if step S23 determines that a diffractive optical element is to be included in the system, step S330, in one embodiment, calculates the chromatic correction terms using the following matrix formula:

$$\begin{pmatrix} \eta_{11} \eta_{12} \eta_{13} \\ \eta_{21} \eta_{22} \eta_{23} \cdots \\ \cdot \\ \cdot \\ \cdot \end{pmatrix} \begin{pmatrix} a_1 b_1 \\ a_2 b_2 \\ \cdot \\ \cdot \\ \cdot \end{pmatrix} = \begin{pmatrix} x & y \\ 2.5x & 2.5y \end{pmatrix} \quad (14)$$

This formula is similar to the linear algebraic formula discussed above with respect to FIGS. 3–8. More specifically, the axial and lateral color terms are inserted into the lens matrix. As before, a glass matrix is multiplied by the lens matrix; however, in this situation, the product of the multiplication is not set equal to zero.

Upon solving the linear algebraic formulas, the process at step S330 calculates chromatic correction terms which represent optical materials that can be used in conjunction with a diffractive optical element to correct for chromatic aberration. At step S270, these chromatic correction terms are utilized in a mapping function to determine the exact optical material. The optical material information and information indicating the use of a diffractive optical element is then conveyed to the designer at step S290.

However, Equation (13) can be used with a slight modification to the η values when the optical materials are known and the user desires to identify the lens form. More specifically, the terms in the glass matrix associated with the diffractive optical elements are as follows:

$$\eta_{1,DOE} = \frac{1}{\lambda_0}, \quad (15)$$

$$\eta_{2,DOE} = \frac{2.5}{\lambda_0}, \quad (16)$$

If this second method is utilized the process illustrated in FIG. 9 is modified such that step S40 inputs the chromatic correction terms and step S330 calculates the actual axial and lateral color terms. Then, step S270 is modified to look up a lens form based on the calculated axial and lateral color terms, wherein step S290 will display the lens form and diffractive optical element information.

Each of the processes discussed above can be used to facilitate the manufacturing of a color corrected optical system. More specifically, by pre-defining the lens system and using one of the processes described above to select the glass material, one of ordinary skill in the art would be able to manufacture an optical system following the lens and optical material specifications which is color corrected.

Figure 10:
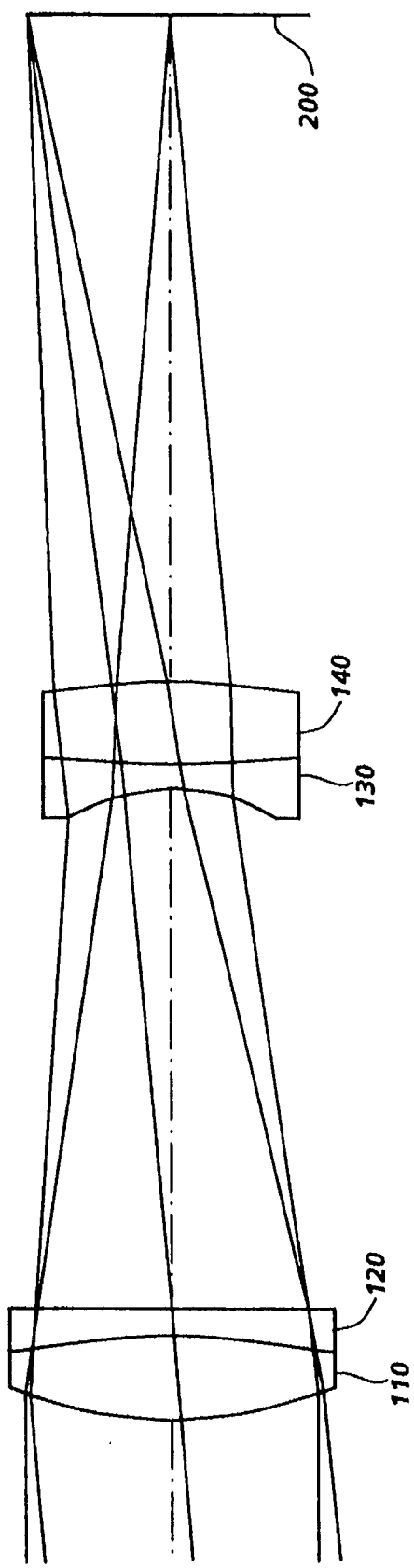
FIG. 10 illustrates a typical Kingslake Telephoto lens system.

FIG. 10 illustrates a typical Kingslake telephoto lens design. In this conventional lens design, a convex lens 110 is formed in contact with a concave lens 120. Lenses 110 and 120 form a first lens subsystem. The Kingslake Telephoto lens system also includes another concave lens 130 formed in contact with a convex lens 140. Lenses 130 and 140 form a second lens subsystem. It is noted that there is an air gap between the first lens subsystem and the second lens subsystem. The light initially passes through the first lens subsystem wherein this lens subsystem causes the light to converge. The second lens subsystem receives the converging light and causes the light, as it passes therethrough, to be incident upon a screen 200 wherein the light can be viewed.

As discussed above, typical lens systems encounter problems with chromatic aberration. This problem, as applied to the Kingslake Telephoto lens design is graphically illustrated in FIG. 11. For this example, the focal length of the system is 254 mm. In FIG. 11, the transverse axial (solid line) and lateral (dash line) chromatic aberrations are plotted versus wavelength λ for the Kingslake Telephoto system when utilizing normal glasses. This system demonstrates that the primary color correction is defined with respect to two widely spaced wavelengths, namely approximately 460 nm and 585 nm.

If the system contains no aberration problems, both the transverse lateral chromatic aberration line and the transverse axial chromatic aberration line would be relatively flat and very close to the horizontal axis (0.0000). It is further noted that the transverse axial chromatic aberration significantly increases outside the wavelength range of 460 nm and 585 nm.

Figure 12:
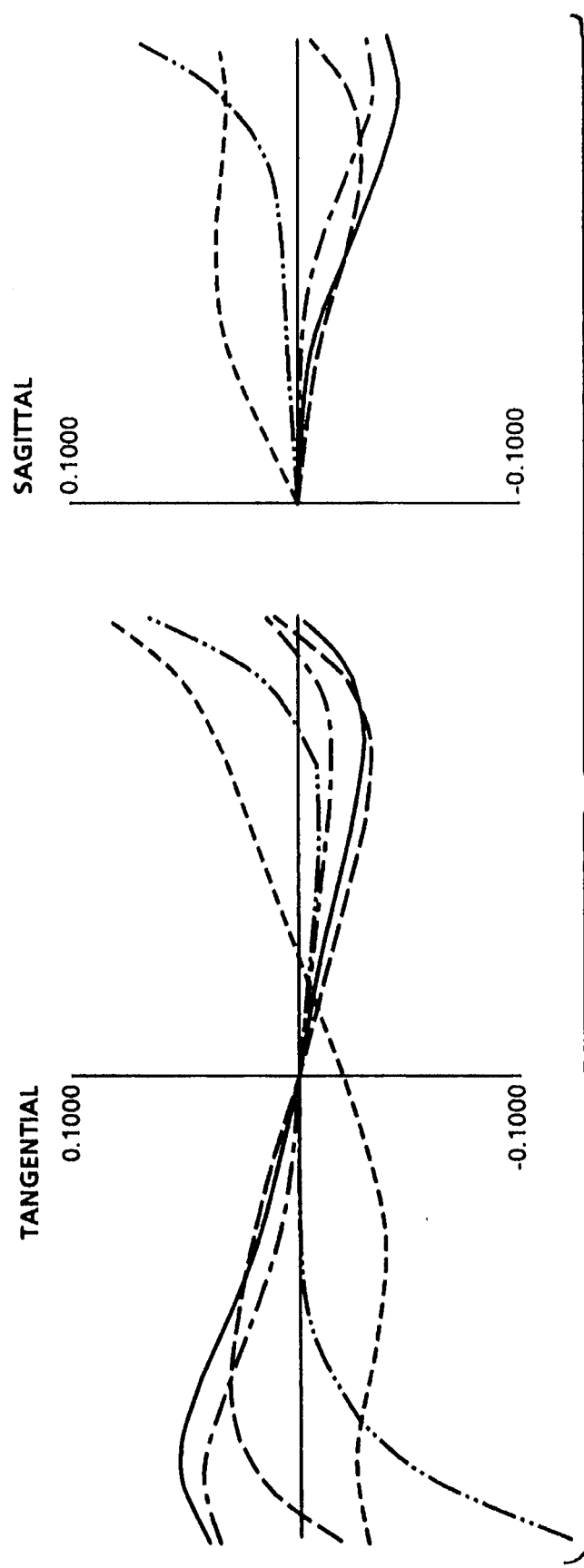
FIG. 12 is a graph illustrating the tangential and sagittal rim ray plots for a 1.00 relative field height at 5.00° for a typical Kingslake Telephoto lens system of normal glasses.
Figure 13:
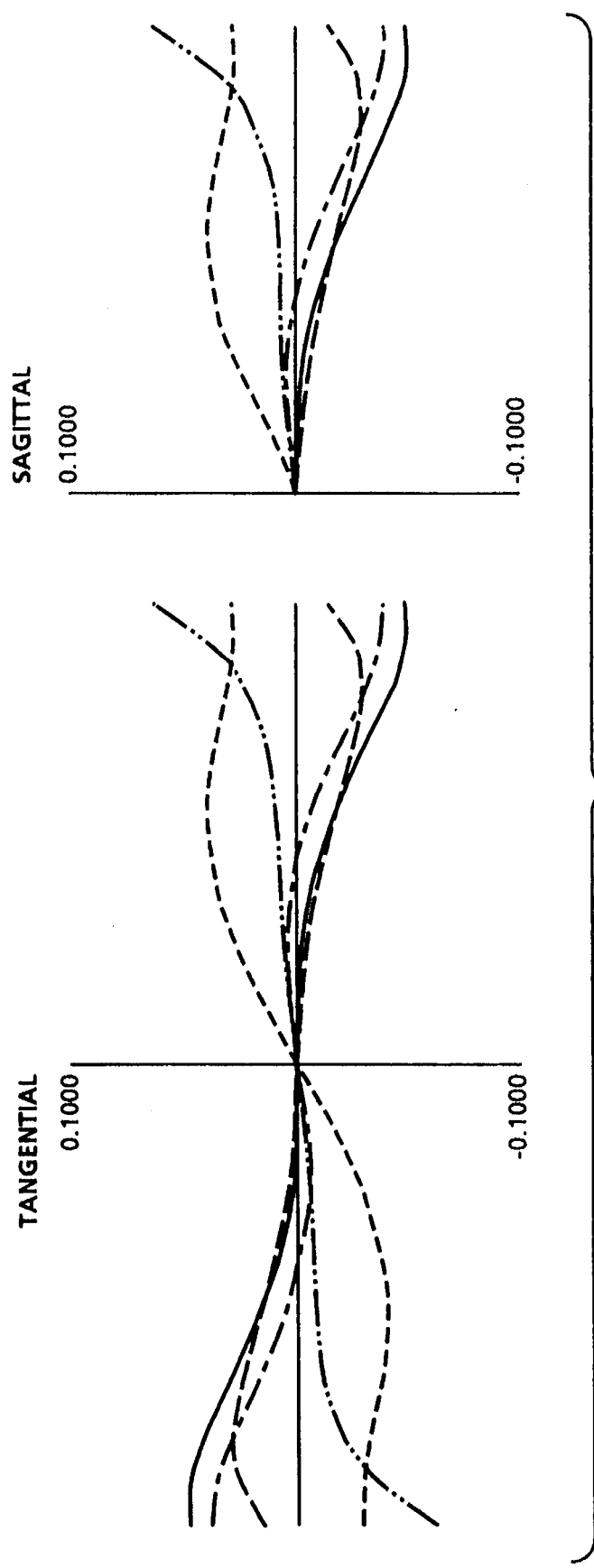
FIG. 13 is a graph illustrating the tangential and sagittal rim ray plots for a 0.00 relative field height at 0.00° for a typical Kingslake Telephoto lens system of normal glasses.

FIGS. 12 and 13 illustrate the rim ray curves for an uncorrected Kingslake telephoto design system. More specifically, FIG. 12 illustrates the rim ray curves for a 1.00 relative field height (5.000°) situation for both tangential and sagittal values, whereas FIG. 13 illustrates a 0.00 relative field height (0.00°) situation for both the tangential and sagittal values. The tangential values of FIG. 13 represent the ray error (y-coordinate) as a function of the light travelling from a point source on the center axis to either vertical edge of the pupil of the lens for a variety of wavelengths. It is noted that the pupil is not symmetric to the center axis for the 1.00 relative field height (5.000°) situation, and thus the tangential values for negative and positive values are not the same, whereas the pupil is symmetric to the center axis for the 0.00 relative field height (0.000°) situation, and the tangential values for both the negative and positive values are the same. The sagittal values of FIG. 13 represent the ray error (y-coordinate) as a function of the light travelling from a point source on the center axis to either horizontal edge of the lens for a variety of wavelengths. It is noted that this situation symmetric to the center axis, and thus the sagittal values are only plotted as positive values. FIG. 12 represents tangential and sagittal values for a point source not on the center axis.

In both FIGS. 12 and 13, the solid line represent the values for the wavelength of 587.6 nanometers; the short dash line represents the value for the wavelength of 852.1 nanometers; the long dash short dash curve represents the values for the wavelength of 656.3 nanometers; the long dash curve represents the values for the wavelength of 486.1 nanometers; and the dash two dot curve represents the values for the wavelength of 435.8 nanometers. If the system was color corrected, these curves would lie on top of one another.

For simplicity, only two different glasses will be used to attempt to correct the secondary axial color. If the first and third elements, and the second and fourth elements, are assumed to be of the same glass, the normalized lens matrix values become approximately: $a_1=1.00$, $a_2=-0.55$, and $b_1=1.00$, $b_2=-0.62$ with a power ratio R of $-0.55$.

After utilizing the method of the present invention, it is determined that the glass terms are for $\lambda_0=587.56$: $\eta_1=-0.067207$ and $\eta_2=-0.004524$ for the first and third elements and $\eta_1=-0.115796$ and $\eta_2=-0.000355$ for the second and fourth elements. These glass terms represent glasses more suited to optimally correct the chromatic aberration problems associated with the Kingslake Telephoto lens system, namely PK51A and KZFS1. These glasses are readily known to those of ordinary skill in the art and are listed as Schott™ glasses. When utilizing PK51A glass for the concave lenses and KZFS1 glass for the convex lenses in the Kingslake Telephoto lens system, the transverse axial and lateral chromatic aberrations effectively disappear.

Figure 14:
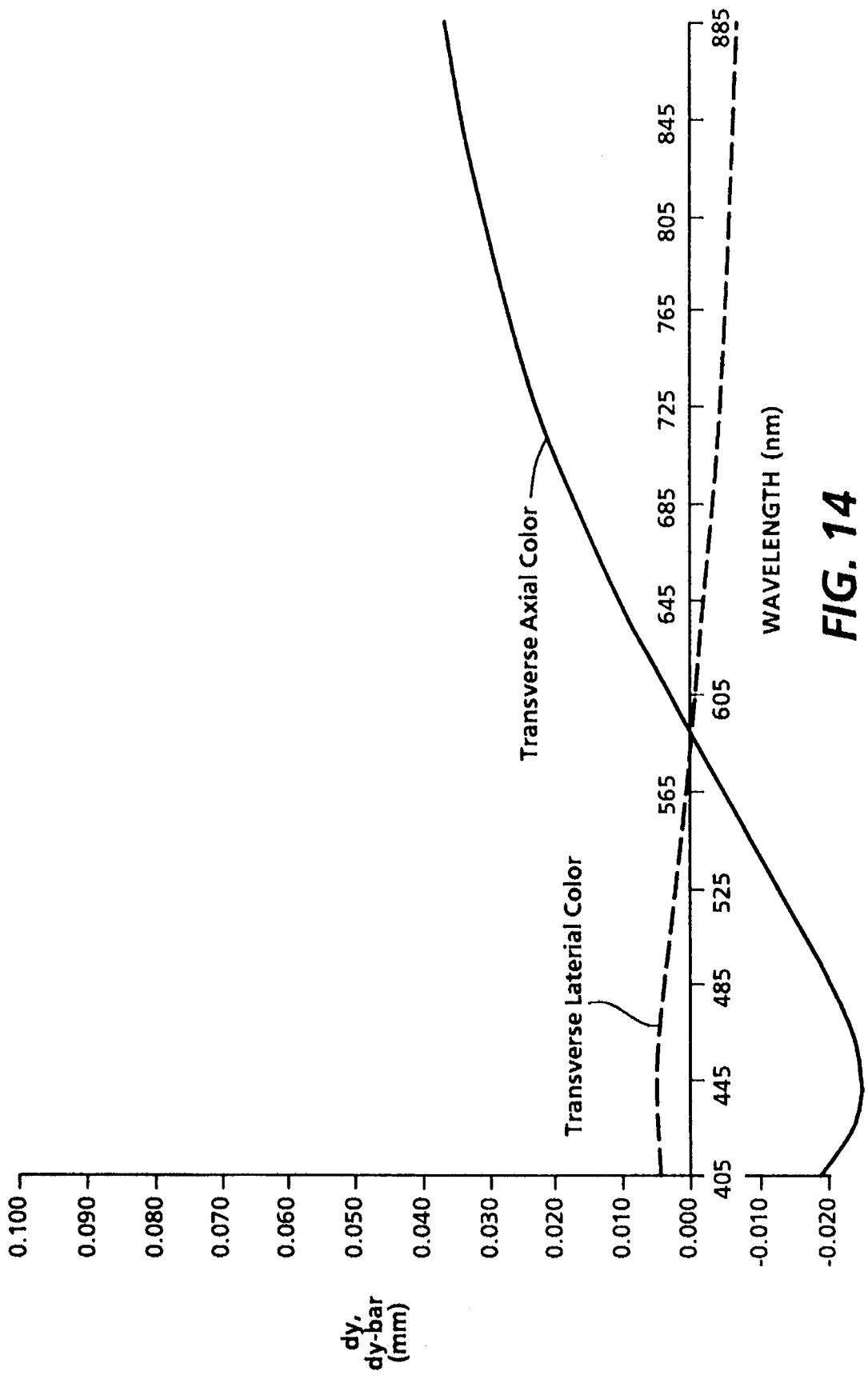
FIG. 14 is a graph illustrating transverse axial and transverse lateral chromatic errors as a function of wavelength for a color balanced Kingslake Telephoto lens system using the method of the present invention.

More specifically, as illustrated in FIG. 14, the dotted line representing the transverse lateral chromatic aberration is substantially flat and essentially parallel to the horizontal axis. Moreover, it is noted that the transverse axial color curve, the solid line, has a substantially reduced slope such that this aspect of chromatic aberration has been significantly corrected. It is noted that if the transverse axial color line is rotated such that the y-intercept is made to be greater than 0, the curve would then be substantially flat and essentially parallel to the horizontal axis.

Figure 15:
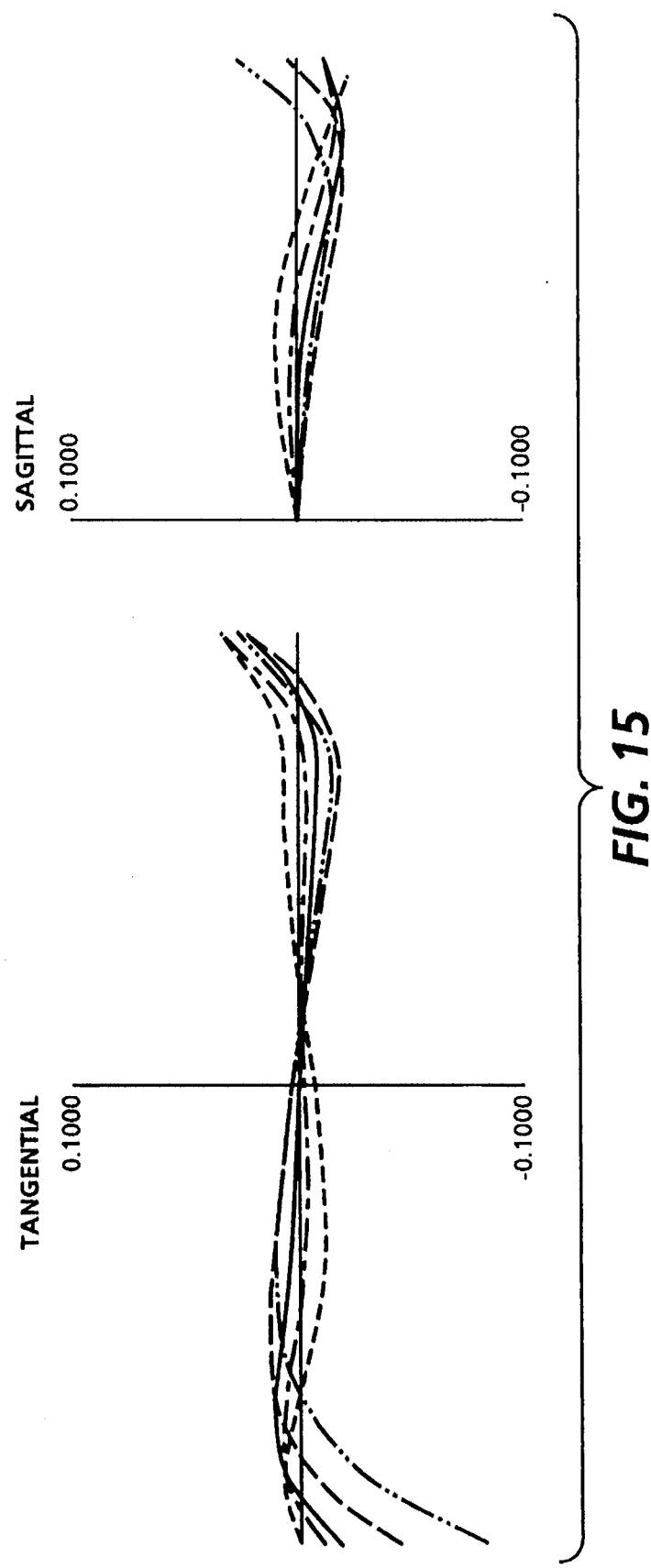
FIG. 15 is a graph illustrating the tangential and sagittal rim ray plots for a 1.00 relative field height at 5.00° for a color corrected Kingslake Telephoto lens system using the method of the present invention.
Figure 16:
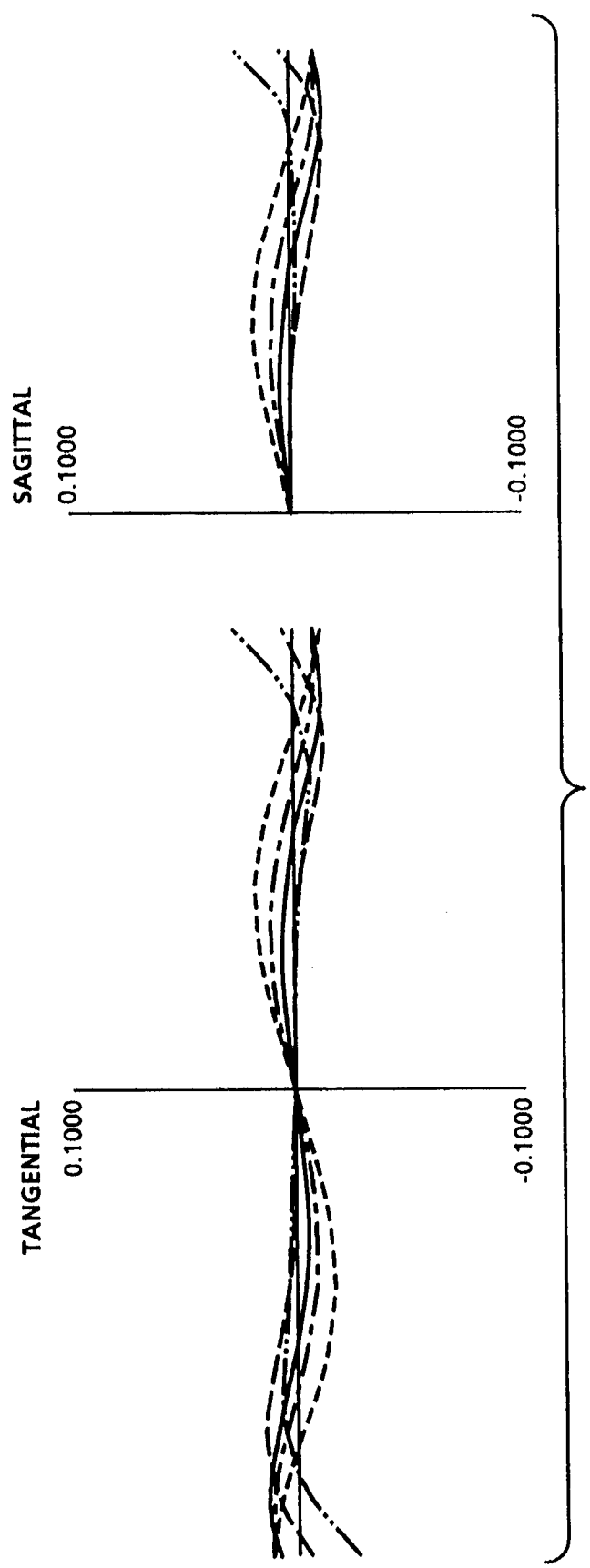
FIG. 16 is a graph illustrating the tangential and sagittal rim ray plots for a 0.00 relative field height at 0.00° for a color corrected Kingslake Telephoto lens system using the method of the present invention.

The chromatic aberration curves and the rim ray plots for the PK51A/KZFS1 telephoto are shown in FIGS. 14–16. As can be seen from these Figures, though there is some residual primary axial chromatic aberration, the shape of the axial color curve indicates the substantial reduction of secondary chromatic aberration. In addition, the rim ray curves are relatively flat, with little chromatic variation evident.

In another example using the method of the present invention, a Cooke Triplet system will be designed. This example will illustrate secondary color correction of the Cooke Triplet.

The example corresponds to an f/4.5 100 mm focal length Cooke Triplet, 40° full field lens system. In analyzing an uncorrected version of this system, large chromatic variations are found over the wavelength range of 405 to 852 nm.

In this case, the lens matrix value for the Cooke Triplet are: $a_1=1.0$, $a_2=-1.1$, $a_3=0.9$, and $b_1=1.0$, $b_2=0.04$, and $b_3=-1.04$ with the power ratio R of the sum of the negative $a_j$'s to the sum of the positive $a_j$'s being $-0.58$.

Using the method of the present invention, it is determined that the glass terms are for $\lambda_o=587.56$: $\eta_1=-0.067207$ and $\eta_2=-0.004524$ for the first and third elements and $\eta_1=-0.115796$ and $\eta_2=-0.000355$ for the second and fourth elements. These glass terms represent glasses more suited to optimally correct the chromatic aberration problems associated with the Cooke Triplet lens system, namely that the first and third elements should be constructed of PK51A glass and the second element should be constructed of KZFS1 glass. If one were to plot the result of the corrected optical system as a plot of $\Delta y$ vs. $\lambda$, one would find both the lateral and axial curves to be nearly flat from 500 nanometers to past 850 nanometers, indicating third order or higher curves. Moreover, one would find that secondary axial and lateral color correction have been realized with this corrected design.

The design method of the present invention can also be utilized to correct chromatic aberration using a diffractive optical element as the means to correct chromatic aberration. Diffractive optical elements are more and more widely used in a variety of optical systems. Since diffractive optics have such unique $\eta_i$ values (as compared to any other optical material), they are able to be used to correct chromatic aberration problems uncorrectable with standard materials.

A diffractive optical element (DOE) typically consists of a standard optical element onto which some kind of surface relief structure has been added. The surface relief structure uses diffraction to modify the incident light. If one were to analyze a glass map that contains plots of all the optical materials and a diffractive optical element, one would see that the plot for the diffractive optical element (DOE) is spaced significantly away from the plots for the optical materials.

Thus, when choosing the proper optical materials for a lens system to correct for chromatic aberration, the diffractive optical element provides more effective values that would enable the lens system to become nearly color corrected. An example of the value of a diffractive optical element is seen when correcting a monochromatic quartet.

The unique characteristic of the monochromatic quartet is that there is approximately 3.9 times difference between the positive coefficients of the axial color terms and the negative coefficients of the axial color terms. Moreover, the monochromatic quartet is similar to an inside-out triplet and thus needs glasses at opposite ends of the $\eta_1$–$\eta_2$ plot to correct for primary color. Furthermore, it is known that secondary chromatic aberration in a monochromatic quartet is probably uncorrectable with standard optical glasses.

Realizing these various characteristics of a monochromatic quartet, the lens system is a good candidate for a diffractive optical element. In order to utilize the lens design method of the present invention so that a diffractive optical element can be included in the lens system, the method is modified slightly as discussed above and will be briefly described below.

In order to incorporate a DOE into the method of the present invention, the equivalent $\eta_i$ coefficients must be defined. A refractive index model is used in defining the DOE coefficients such that:

$$[N(\lambda) - 1] = [N(\lambda_0) - 1]\frac{\lambda}{\lambda_0} . \tag{17}$$

$$\frac{\lambda}{\lambda_0} = 1 + \eta_1\omega + \eta_2\omega^2 + \eta_3\omega^3 + \ldots \tag{18}$$

Since $\lambda = \lambda_0 + \Delta\lambda$;

$$\frac{\Delta\lambda}{\lambda_0} = \eta_1\omega + \eta_2\omega^2 + \eta_3\omega^3 + \ldots \tag{19}$$

Moreover, $$\Delta\lambda = \frac{\omega}{1 - 2.5\omega} , \tag{20}$$

which, expanded as a Taylor series, is:

$$\Delta\lambda = \omega[1 + 2.5\ \omega + 6.25\ \omega^2 + \ldots]. \tag{21}$$

Comparing the equations above, the terms of like powers of $\omega$ are associated to obtain:

$$\eta_{1,DOE} = \frac{1}{\lambda_0}, \quad (22)$$

$$\eta_{2,DOE} = \frac{2.5}{\lambda_0}, \quad (23)$$

A simple example illustrating the method of the present invention in conjunction with a DOE will address the apochromatization of the 1990 International Lens Design Conference (1990 ILDC) monochromatic quartet. Though the resulting lens is not useful in other than an academic sense, this example demonstrates the ability of this present invention to design a color corrected thick lens systems.

The 1990 ILDC monochromatic quartet is a single glass design, thus, there is no chromatic correction. The normalized lens matrix values for this lens are: $a_1=1.0$, $a_2=-2.8$; $a_3=-1.1$, $a_4=0.03$, and $b_1=1.0$, $b_2=-1.3$, $b_3=0.8$, and $b_4=-0.07$ with a power ratio R of $-3.9$, which is also characteristic of an inside-out triplet, from which this design form was derived.

Using conventional methods, one realizes that, for any set of 3 or 4 optical materials in a glass map, it is improbable to correct chromatic aberration, with vector summation, because the magnitude of R differs so much from 1.0. Thus, traditionally, a lens designer would consider splitting lenses or adding achromatizing buried surfaces to correct the chromatic aberrations. These procedures would change the lens matrix values significantly.

Instead, the use of a DOE in conjunction with the present invention permits the secondary chromatic aberrations to be corrected without changing the fundamental lens design form. As shown above, $\eta_{2,DOE}=2.5*\eta_{1,DOE}$. Therefore, when $$Ea_j\eta_{2,j}=2.5*Ea_j\eta_{1,j}$$

$$Eb_j\eta_{2,j}=2.5*Eb_j\eta_{1,j} \quad (24)$$

is solved, both primary and secondary axial and lateral color can be correctable with a DOE.

Solving the matrix analysis of the present invention, it is determined that the glass terms are: $\eta_1=-0.231414$ and $\eta_2=-0.106123$ for the first glass; $\eta_1=-0.095921$ and $\eta_2=-0.006219$ for the second glass; $\eta_1=-0.057248$ and $\eta_2=-0.008073$ for the third glass; and $\eta_1=-0.231414$ and $\eta_2=-0.106123$ for the fourth glass. These glass terms represent glasses more suited to optimally correct the chromatic aberration problems associated with the monochromatic quartet lens system using a diffractive optical element, namely that the first glass is SF58, the second glass is LaK8, the third glass is FK54, and the fourth glass should be SF58. If one were to plot the chromatic aberration curves, the curves would demonstrate a significantly reduced level of primary and secondary axial and lateral color, and the rim ray plots would be relatively flat over the wavelength range 405 to 852 nanometers. Lastly, the power ratio R of this corrected design is about $-3.0$, and the stop is moved to behind the first element.

The examples above illustrate the general applicability of the glass materials selection technique of the present invention to correct the primary and higher order chromatic aberrations for both thick lens systems, thin lens systems, and refractive/diffractive hybrids. Although the present description shows the present invention being applied to three lens system, the technique is applicable to any lens system being designed for color correction.

The examples above also illustrate the general applicability of the present invention's matrix solutions for optical material selection techniques to correct the primary and higher order chromatic aberrations for both thick lens systems, thin lens systems and refractive/diffractive hybrids. Although the present description discusses a matrix solution, the color correction of the lens system can also be realized by using a reiterative process that allows the $\eta$ values to vary over the process. More specifically, the present invention contemplates a computer process which establishes an initial lens form and $\eta$ values and determines the color aberration parameters of the system therefrom. If the color aberration parameters do not meet the guidelines of the user, either the lens form and/or the $\eta$ values can be changed and the color aberration parameters determined for the new system. This process is repeated automatically until a lens system is found that meets the guidelines of the user. An example of such a system would be a system similar to the presently used CODE-V™ process wherein the $\eta$ values are allowed to vary.

Although the present invention has been described as a system or method wherein the user inputs known axial and lateral color terms, these terms could be determined by a device which measures color aberration and then inputted into the system or method of the present invention. The device would measure color aberration of a known lens form constructed of known optical material and calculate the axial and lateral color terms for the lens form therefrom. These terms, representing the physical properties of the lens form, can be utilized in the present invention to determine the optical materials to construct the lens form which results in an optical system having the least color aberration.

The present invention has been described as a method for selecting optical materials in designing a lens system. As is well known in the art, designing such systems takes into account optimization and tradeoffs. The present invention is readily applicable to such procedures in that the method of the present invention would be utilized for each iteration of an optimization process. Thus, although the present invention has been described as a single process for optical material selection, it can be the subcomponent of an iterative optimization process. It is further noted that the same results can be realized by taking Equation (13) and allowing the $\eta_i$s to vary in the designing routine.

Lastly, although the present invention has been described in conjunction with known optical materials, the present invention can be used to predict the properties of unknown optical materials. For example, the present invention could predict if an optical material having certain $\eta_i$ values would be able to color correct the lens system.

While the invention has been described with reference to the various embodiments disclosed above, it is not confined to the details set forth above, but is intended to over such modifications or changes as may come within the scope of the attached claims.

What is claimed is:

1. A method for selecting optical materials for a color corrected optical system, comprising the steps of:

(a) electronically generating axial color terms for a predetermined lens system;

(b) electronically generating lateral color terms for the predetermined lens system;

(c) electronically calculating a plurality of glass terms from a plurality of linear algebraic formulas as a function of a plurality of matrices set equal to zero using the generated axial and lateral color terms as coefficient values in one of the matrices;

(d) electronically converting the calculated glass terms into information identifying particular optical materials; and (e) electronically providing the information identifying the particular optical materials and the predetermined lens design to a user as parameters for a color corrected optical system.

2. The method as claimed in claim 1, wherein said step (d) comprises the substep of:

(d1) electronically retrieving information identifying particular optical materials from a memory using the calculated glass terms as retrieval parameters.

3. The method as claimed in claim 1, further comprising the step of:

(f) inputting information defining the predetermined lens system;

said step (a) electronically generating the axial color terms by retrieving, from a read only memory, axial color terms associated with the input information defining the predetermined lens system; and said step (b) electronically generating the lateral color terms by retrieving, from the read only memory, lateral terms associated with the input information defining the predetermined lens system.

4. The method as claimed in claim 2, wherein said step (e) comprises the step of electronically displaying the information identifying the particular optical materials on a display screen.

5. The method as claimed in claim 2, wherein said step (e) comprises the step of printing the information identifying the particular optical materials.

6. The method as claimed in claim 2, wherein said step (e) comprises the step of electronically providing the particular optical materials as coordinates on a glass map.

7. The method as claimed in claim 1, further comprising the steps of:

(f) inputting information defining the predetermined lens system;

said step (a) electronically generating a plurality of ranges of axial color terms by retrieving, from a read only memory, the range of axial color terms associated with the inputted information;

said step (b) electronically generating a plurality of ranges of lateral color terms by retrieving, from the read only memory, the range of lateral color terms associated with the inputted information;

(g) selecting a single axial color term for each generated range of axial color terms; and (h) selecting a single lateral color term for each generated range of lateral color terms;

said step (c) electronically calculating the plurality of glass terms using the selected axial and lateral color terms as the coefficient values in one of the matrices.

8. The method as claimed in claim 2, further comprising the steps of:

(f) determining if a diffractive optical element is to be included in the predetermined lens design; and (g) electronically calculating a plurality of glass terms from a plurality of linear algebraic formulas generated as a function of a plurality of matrices set equal to a non-zero matrix using the generated axial and lateral color terms as the coefficient values in one of the matrices when said step (f) makes a positive determination;

said step (d1) electronically retrieving information identifying particular optical materials using the glass terms calculated in said step (g);

said step (e) electronically providing the information identifying the particular optical materials to be used in conjunction with a diffractive optical element.

9. A system for selecting optical materials for a color corrected optical system, comprising:

input means for inputting information defining a predetermined lens system;

color term means for generating axial color terms and lateral color terms for the predetermined lens system;

processor means for calculating a plurality of glass terms from a plurality of linear algebraic formulas generated as a function of a plurality of matrices set equal to zero using the generated axial and lateral color terms as coefficient values in one of the matrices; and glass means for determining the particular optical materials and predetermined lens design as a function of the calculated glass terms.

10. The system as claimed in claim 9 wherein said glass means comprises:

memory means for outputting information identifying particular optical materials using the calculated glass terms as retrieval parameters; and output means for providing the information identifying the particular optical materials and the predetermined lens design to a user as parameters for a color corrected optical system.

11. The system as claimed in claim 9, wherein said color term means generates the axial color terms and lateral color terms by retrieving, from a read only memory, axial color terms and lateral color terms associated with the inputted information.

12. The system as claimed in claim 10, wherein said output means displays the information identifying the particular optical material on a display screen.

13. The system as claimed in claim 9, wherein the information identifying the particular optical materials corresponds to coordinates on a glass map.

14. The system as claimed in claim 9, further comprising:

a read only memory;

said color term means generating a plurality of ranges of axial color terms and a plurality of ranges of lateral color terms by retrieving, from said read only memory, the range of axial color terms and the range of lateral color terms associated with the inputted information; and means for selecting a single axial color term for each generated range of axial color terms and a single lateral color term for each generated range of lateral color terms;

said processor means calculating the plurality of glass terms using the selected axial and lateral color terms as the coefficient values in one of the matrices.

15. The system as claimed in claim 10, further comprising:

first means for determining if a diffractive optical element is to be included in the predetermined lens design;

said processor means calculating a plurality of glass terms from the plurality of linear algebraic formulas generated as a function of a plurality of matrices set equal to a non-zero matrix using the generated axial and lateral color terms when said first means makes a positive determination;

said memory means outputting information identifying particular optical materials using the glass terms calculated by said processor means;

said output means providing the information identifying the particular optical materials to be used in conjunction with a diffractive optical element.

* * * * *